United States Patent
Bea et al.

(10) Patent No.: US 8,339,052 B2
(45) Date of Patent: Dec. 25, 2012

(54) POWER SUPPLY APPARATUS AND METHOD FOR AMOLED

(75) Inventors: Sung-Hoon Bea, Nowon-gu (KR); Hwan Cho, Goyang-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 326 days.

(21) Appl. No.: 12/638,255

(22) Filed: Dec. 15, 2009

(65) Prior Publication Data

US 2010/0164391 A1  Jul. 1, 2010

(30) Foreign Application Priority Data

Dec. 29, 2008  (KR) .................. 10-2008-0135769

(51) Int. Cl.
*H05B 37/02* (2006.01)
*H03K 3/02* (2006.01)

(52) U.S. Cl. ............... 315/209 R; 315/224; 315/291; 331/143

(58) Field of Classification Search .... 315/169.1–169.4, 315/209 R, 224, 225, 291, 307, 312; 345/76, 345/77, 82, 84, 204, 211, 214; 331/16, 17, 331/143, 144, 185, 186
See application file for complete search history.

(56) References Cited

U.S. PATENT DOCUMENTS

| | | | | |
|---|---|---|---|---|
| 6,894,436 B2 * | 5/2005 | Togashi et al. | ............ | 315/169.4 |
| RE39,341 E * | 10/2006 | Kataoka et al. | ............... | 315/291 |
| 7,420,431 B2 * | 9/2008 | Hwang et al. | ................. | 331/143 |
| 7,902,932 B2 * | 3/2011 | Jang et al. | ..................... | 331/143 |
| 2004/0252087 A1 * | 12/2004 | Yazawa | ........................... | 345/76 |

* cited by examiner

*Primary Examiner* — Jimmy Vu
(74) *Attorney, Agent, or Firm* — Sherr & Vaughn, PLLC

(57) ABSTRACT

A power supply apparatus and method for an active matrix organic light emitting diode (AMOLED) is disclosed. The power supply apparatus supplies power to the AMOLED while using a switching frequency varied in accordance with a clock signal, and includes a load checker for comparing a load current of the AMOLED with a first reference voltage, and outputs a result of the comparison as a load check signal, and a frequency oscillator for generating the clock signal which has a variable frequency in response to the load check signal. The power supply apparatus is switched in accordance with a clock signal having a frequency modulated based on a load condition of the AMOLED, for example, a load current. Accordingly, it is possible to reduce switching power loss caused by unnecessary power consumption under the condition that a small load current is generated, thereby achieving an enhancement in efficiency.

16 Claims, 2 Drawing Sheets

POWER SUPPLY APPARATUS AND METHOD FOR AMOLED

Figure 1:
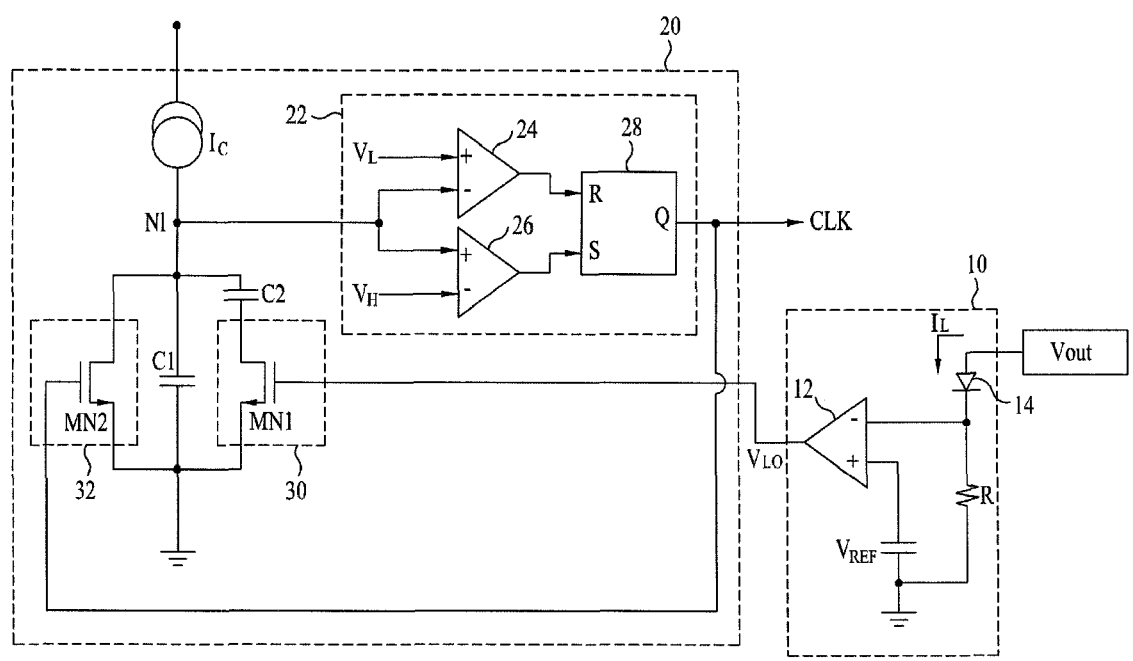

The present application claims priority under 35 U.S.C. §119 to Korean Patent Application No. 10-2008-0135769 (filed on Dec. 29, 2008), which is hereby incorporated by reference in its entirety.

BACKGROUND

An integrated circuit (IC) to supply power to an active matrix organic light emitting diode (AMOLED) (hereinafter, referred to as a power supply apparatus) stably supplies power to the AMOLED. In most cases, such an IC includes a buck or boost converter for forming a positive voltage in accordance with the condition of an input voltage, and an inverter for forming a negative voltage in accordance with the condition of the input voltage. The IC uses internal elements such as an NMOS transistor at a positive stage and a PMOS transistor at a negative stage.

In practical application of the IC, the positive and negative stages form opposite voltages for an OLED, respectively. The amount of current flowing through the output-stage transistor of the power supply apparatus directly determines the magnitude of power. Different from a linear device, the power supply apparatus operates in a switch mode, in order to achieve an enhancement in efficiency. Ideally, the power supply apparatus should exhibit a constant efficiency irrespective of the magnitude of a load. In practical cases, however, internal power loss is inevitably generated due to the circuit and system used in the power supply apparatus.

The power loss of the power supply apparatus may be mainly divided into switching loss and conduction loss. Where a power transistor having a large capacity is used as a switch, the conduction loss is proportional to the size of the power transistor. In order to reduce the conduction loss, accordingly, the power supply apparatus uses a high switching frequency. In this case, however, an increase in switching loss occurs. Since there is a trade-off between switching loss and conduction loss, an appropriate switching frequency should be used, and the power transistor should have an appropriate size.

The power loss in a general power supply apparatus may be expressed by the following Expression 1:

$$P_{avg} = P_{switching} + P_{short-circuit} + P_{leakage} + P_{static}$$

In Expression 1, "$P_{switching}$" represents a switching component of the power, namely, a power loss caused by a charge/discharge parasitic capacitance, and corresponds to about 70 to 90% of the overall loss. "$P_{short-circuit}$" represents a power loss caused by an ON resistance of the power transistor, and corresponds to about 10 to 30% of the overall loss. "$P_{leakage}$" represents a leakage component of the power, and corresponds to about 1% or less of the overall loss. "$P_{static}$" represents static power.

In a circuit using an ideal MOS transistor, there is little or no static power. Referring to Expression 1, it can be seen that the power loss caused by the switching power "$P_{switching}$" is largest in the average power "$P_{average}$" of the power supply apparatus.

Nevertheless, in most cases, the size of the power transistor is preferentially taken into consideration, upon designing the power supply apparatus, in order to drive maximal power. For this reason, the power supply apparatus uses an increased frequency. Although optimal design is possible under a normal load condition, there may be a problem in that, under a low-load condition, degradation in efficiency inevitably occurs when the frequency is high.

SUMMARY

Embodiments relate to a power supply apparatus and method for an AMOLED, which achieves a switching operation at a low frequency in accordance with a load condition of the AMOLED, thereby reducing unnecessarily consumed switching power.

Additional advantages, objects, and features of the invention will be set forth in part in the description which follows and in part will become apparent to those having ordinary skill in the art upon examination of the following or may be learned from practice of the invention.

In accordance with embodiments, a power supply apparatus for an active matrix organic light emitting diode (AMOLED), to supply power to the AMOLED while using a switching frequency varied in accordance with a clock signal, can include at least one of the following: a load checker which compares a load current of the AMOLED with a first reference voltage, and outputs a result of the comparison as a load check signal; and a frequency oscillator which generates the clock signal and has a variable frequency, in response to the load check signal.

In accordance with embodiments, a power supply apparatus for an active matrix organic light emitting diode (AMOLED), to supply power to the AMOLED while using a switching frequency varied in accordance with a clock signal, can include at least one of the following: a load checker which compares a load current of the AMOLED with a first reference voltage and outputs a result of the comparison as a load check signal, the load checker comprising an external resistance having one end electrically connected to the load current and another end electrically connected to a ground, and a first comparator having a positive input terminal electrically connected to one end of the external resistance and a positive input terminal electrically connected to the first reference voltage; and a frequency oscillator which generates the clock signal, which has a variable frequency, in response to the load check signal, the frequency oscillator comprising a current source which supplies a constant current, a plurality of capacitors electrically connected in parallel between the constant current and the ground, a first switch electrically connected between a first part of the capacitors and the ground, the first switch being switched in response to the load check signal, a second switch electrically connected in parallel to a second part of the capacitors, the second switch being switched in response to the clock signal, and a switching unit which outputs the clock signal in accordance with a result of a comparison of voltages respectively charged in the capacitors with second reference voltages.

In accordance with embodiments, a power supply method for an active matrix organic light emitting diode (AMOLED) in a power supply apparatus to supply power to the AMOLED while using a switching frequency varied in accordance with a clock signal can include at least one of the following: determining whether a load current of the AMOLED is less than a critical value; and then decreasing a frequency of the clock signal when it is determined that the load current is less than the critical value.

DRAWINGS

Example FIG. 1 illustrates a power supply apparatus for an active matrix organic light emitting diode (AMOLED), in accordance with embodiments.

Figure 2:
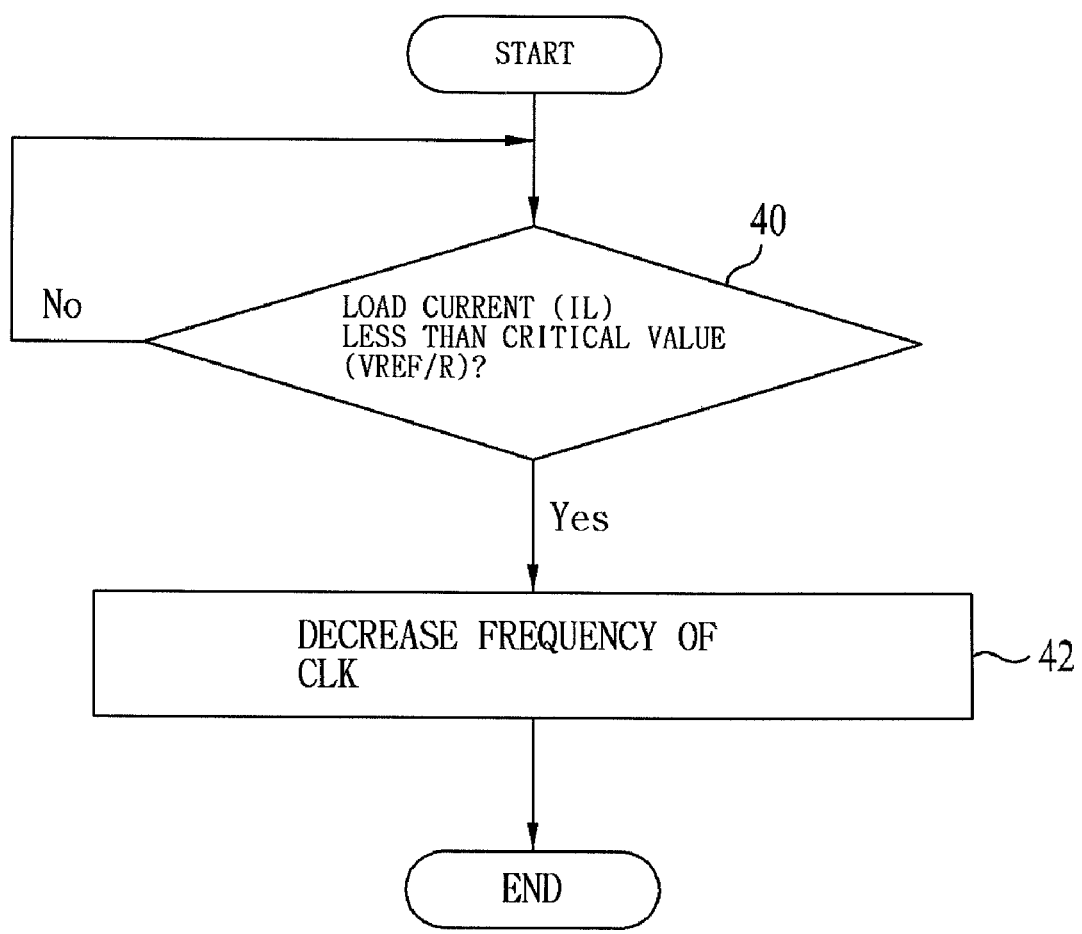

Example FIG. 2 illustrates a flow chart explaining a power supply method for an AMOLED, in accordance with embodiments.

DESCRIPTION

Hereinafter, a power supply apparatus for an active matrix organic light emitting diode (AMOLED) in accordance with embodiments will be described with reference to the accompanying drawings.

The power supply apparatus can serve to supply power to the AMOLED while varying a switching frequency thereof in accordance with a clock signal CLK. A general circuit to supply power to the AMOLED of the power supply apparatus in accordance with embodiments may be used, and thus, description will focus only upon a part of the power supply apparatus which serves to vary the frequency of the clock signal in accordance with a load current of the AMOLED.

As illustrated in example FIG. 1, the power supply apparatus can include load checker 10 and frequency oscillator 20. Load checker 10 compares load current $I_L$ of the AMOLED with first reference voltage $V_{REF}$, and outputs a result of the comparison as load check signal $V_{LO}$ to frequency oscillator 20. For this function, load checker 10 includes external resistor R, diode 14, and first comparator 12. In this case, load current $I_L$ may be a switching load of a power transistor generally included in the AMOLED power supply apparatus.

Load resistor R has one end connected to load current $I_L$ and the other end connected to ground. Diode 14 has a cathode connected to external resistor R and an anode connected to load voltage Vout. In this case, load voltage Vout may have a fixed value. First comparator 12 includes a negative input terminal (−) connected to one end of external resistor R and a positive input terminal (+) connected to first reference voltage $V_{REF}$.

In load checker 10 having the above-described configuration, a low voltage is applied to the negative input terminal (−) of first comparator 12 when load current $I_L$ is small. In this case, accordingly, load check signal $V_{LO}$ having a "high" logical level, is output to frequency oscillator 20. On the other hand, when load current $I_L$ is large, load check signal $V_{LO}$ having a "low" logical level is output to frequency oscillator 20 because a high voltage is applied to the negative input terminal (−) of first comparator 12.

Referring to the above-described power supply apparatus in accordance with embodiments, it can be seen that load checker 10 performs a function of sensing the condition of the load. Thus, the resistance of external resistor R and the level of first reference voltage $V_{REF}$ can be determined in accordance with the condition of load current $I_L$.

Meanwhile, frequency oscillator 20 generates clock signal CLK having a variable frequency in response to load check signal $V_{LO}$ supplied from load checker 10. For this function, frequency oscillator 20 includes current source Ic, a plurality of capacitors, for example, first capacitor C1, second capacitor C2, first switch 30, second switch 32 and switching unit 22.

Current source Ic can serve to supply a constant current. Capacitors C1 and C2 are connected in parallel between the constant current supplied from the current source Ic and the ground. First switch 30 is connected between a part of capacitors C1 and C2, for example, second capacitor C2, and the ground. First switch 30 is switched in response to load check signal $V_{LO}$ supplied from load checker 10. Although there are only two capacitors C1 and C2 in accordance with the embodiment illustrated in example FIG. 1, embodiments are not limited to the same, and thus, may include three or more capacitors. In such a case, the excessive capacitors except for the two capacitors are connected in parallel between first switch 30 and node N1. For convenience of description, the following description will be given in conjunction with only the two capacitors C1 and C2. However, the principle of embodiments is equivalently applied to the case in which three or more capacitors are used.

First switch 30 may include first NMOS transistor MN1. First NMOS transistor MN1 has a drain and a source which are connected between one of the capacitors C1 and C2, for example, second capacitor C2 and the ground, and a gate connected to load check signal $V_{LO}$. Second switch 30 is electrically connected in parallel to the remaining one of capacitors C1 and C2, namely, first capacitor C1. Second switch 30 is switched in response to clock signal CLK. For this function, second switch 32 includes second NMOS transistor MN2. Second NMOS transistor MN2 has a drain and a source which are connected to current source Ic and the ground, respectively, and a gate connected to clock signal CLK.

Switching unit 22 outputs the clock signal CLK in accordance with results of a comparison between the voltage charged in capacitors C1 and C2 and each of second reference voltages VL and VH.

Operation of frequency oscillator 20 having the above-described configuration will be described in detail. When load current $I_L$ is small, first switch 30 is turned on because load check signal $V_{LO}$ having a "high" logical level is generated. Meaning, first NMOS transistor MN1 is turned on, thereby establishing a path for charging the current supplied from current source Ic in second capacitor C2. In this case, the current supplied from current source Ic is charged in both capacitors C1 and C2. Since the equivalent capacitance in this case is "C1+C2," the charged voltage is increased. Thus, the voltage at node N1 is increased. When the voltage at node N1 is increased, switching unit 22 outputs clock signal CLK under the condition that the frequency of clock signal CLK is decreased. Meaning, the frequency of clock signal CLK is decreased for the increased portion of the capacitance, namely, the capacitance of second capacitor C2. For stable operation of the above-described power supply apparatus, the capacitance of second capacitor C2 connected to first switch 30 may be about half (½) of the capacitance of first capacitor C1. Where load current $I_L$ is small in this case, the frequency of clock signal CLK may be decreased to about ⅔.

On the other hand, where load current $I_L$ is not low, first switch 30 is turned off because load current signal $V_{LO}$ having a "low" logical level is generated. Meaning, first NMOS transistor MN1 is turned off, thereby cutting off the path for charging the current supplied from current source Ic in second capacitor C2. In this case, accordingly, the current supplied from current source Ic is charged only in first capacitor C1. As a result, there is no voltage increase at node N1. In this case, when no voltage increase occurs at node N1, switching unit 22 does not decrease the frequency of clock signal CLK. Meaning, the equivalent capacitance corresponds to the capacitance of capacitor C1 without being increased by the capacitance of capacitor C2, so that the frequency of clock signal CLK is not decreased.

Thus, it can be seen that frequency oscillator 20 modulates the frequency of clock signal CLK in accordance with a variation in load current $I_L$. In this case, second switch 32 is turned on or off in response to clock signal CLK. When clock signal CLK having a "high" logical level is supplied to the gate of second NMOS transistor MN2, second NMOS transistor MN2 is turned on. On the other hand, when clock signal CLK having a "low" logical level is supplied to the gate of second NMOS transistor MN2, second NMOS transistor MN2 is turned off. Thus, the clock signal may be output at a "high" logical level and a "low" logical level in an alternating manner due to the switching operation of second NMOS transistor MN2.

Switching unit 22, which performs a key function to decrease the frequency of clock signal CLK when the voltage at node N1 increases while increasing the frequency of clock signal CLK when the voltage at node N1 decreases, includes second comparator 24 and third comparator 26 and SR flip-flop 28. Second comparator 24 has a negative input terminal (−) connected to a voltage charged in at least one of capacitors C1 and C2, namely, node N1, and a positive input terminal (+) connected to a lower one of the second reference voltages, namely, second reference voltage $V_L$. Third comparator 26 has a positive input terminal (+) connected to a voltage charged in at least one of capacitors C1 and C2, namely, node N1, and a negative input terminal (−) connected to a higher one of the second reference voltages, namely, second reference voltage $V_H$. SR flip-flop 28 has an S-input terminal connected to an output of third comparator 26, an R-input terminal connected to an output of second comparator 24, and an output terminal to output clock signal CLK. Although clock signal CLK is output from positive output terminal Q in the illustrated case, it may be output from a negative output terminal.

As apparent from the above description, the power supply apparatus, which is used for an AMOLED in accordance with embodiments, can reduce power loss caused by unnecessary power consumption occurring during a rapid switching operation carried out irrespective of the amount of load current $I_L$. Accordingly, it is possible to achieve an enhancement in power efficiency when a small load current is generated.

Hereinafter, a power supply method for an AMOLED according to an exemplary embodiment of the present invention will be described with reference to the accompanying drawings. The power supply method shown may be executed in the power supply apparatus illustrated in FIG. 1.

As illustrated in example FIG. 2, in accordance with the power supply method, it is first determined whether load current $I_L$ for the AMOLED is less than a critical value (40). In the circuit illustrated in example FIG. 1, the critical value is $V_{REF}/R$. Determination step 40 may be carried out through the comparison operation of first comparator 12.

When it is determined that load current $I_L$ is less than the critical value, the frequency of clock signal CLK is decreased because load current $I_L$ is determined to be low (42). On the other hand, when it is determined that load current $I_L$ is not less than the critical value, the frequency of clock signal CLK is not decreased.

As apparent from the above description, the power supply apparatus, which is used for an AMOLED in accordance with embodiments, is switched in accordance with a clock signal having a frequency modulated based on a load condition of the AMOLED, for example, a load current. This differs from a general power supply apparatus which is switched in accordance with a clock signal having a fixed frequency, so that it may be unnecessarily switched at high speed, thereby incurring power loss.

Accordingly, the power supply apparatus and method in accordance with embodiments reduces switching power loss caused by unnecessary power consumption under the condition that a small load current is generated, thereby achieving an enhancement in efficiency. Meaning, it is possible to maximize the efficiency enhancement because the influence of the small load current condition is greatly reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power supply apparatus for an active matrix organic light emitting diode (AMOLED), the power supply apparatus comprising:
   a load checker which compares a load current of the AMOLED with a first reference voltage, and outputs a result of the comparison as a load check signal; and
   a frequency oscillator for generating a clock signal, which has a variable frequency, in response to the load check signal,
   wherein the frequency oscillator comprises:
   a current source which supplies a constant current;
   a plurality of capacitors electrically connected in parallel between the constant current and the ground;
   a first switch electrically connected between a part of the capacitors and the ground, the first switch being switched in response to the load check signal;
   a second switch electrically connected to a remaining part of the capacitors in parallel, the second switch being switched in response to the clock signal; and
   a switching unit for outputting the clock signal in accordance with a result of a comparison of voltages respectively charged in the capacitors with second reference voltages.

2. The power supply apparatus of claim 1, wherein the load checker comprises:
   an external resistor having a first end electrically connected to the load current and a second end electrically connected to a ground; and
   a first comparator having a negative input terminal electrically connected to the first end of the external resistor and a positive input terminal connected to the first reference voltage.

3. The power supply apparatus of claim 1, wherein the switching unit comprises:
   a second comparator having a negative input terminal electrically connected to a voltage charged in at least one of the capacitors and a negative input terminal electrically connected to a lower-level one of the second reference voltages;
   a third comparator having a positive input terminal electrically connected to the voltage charged in the at least one of the capacitors and a negative input terminal connected to a higher-level one of the second reference voltages; and
   an SR flip-flop having an S-input terminal electrically connected to an output from the third comparator, an R-input terminal electrically connected to an output from the second comparator, and an output terminal to output the clock signal.

4. The power supply apparatus of claim 1, wherein the first switch comprises:
   an NMOS transistor having a drain and a source which are electrically connected between at least one of the capacitors and the ground; and
   a gate electrically connected to the load check signal.

5. The power supply apparatus of claim 1, wherein the second switch comprises:

an NMOS transistor having a drain and a source which are electrically connected to the current source and the ground, respectively; and a gate electrically connected to the clock signal.

6. The power supply apparatus of claim 1, wherein the capacitor part electrically connected to the first switch has a capacitance corresponding to one half of a capacitance of the capacitor part electrically connected to the second switch.

7. The power supply apparatus of claim 2, wherein the external resistor has a resistance determined in accordance with a condition of the load current.

8. The power supply apparatus of claim 2, wherein the first reference voltage has a level determined in accordance with a condition of the load current.

9. A power supply apparatus for an active matrix organic light emitting diode (AMOLED), to supply power to the AMOLED while using a switching frequency varied in accordance with a clock signal, the power supply apparatus comprising:

a load checker which compares a load current of the AMOLED with a first reference voltage and outputs a result of the comparison as a load check signal, the load checker comprising an external resistor having one end electrically connected to the load current and another end electrically connected to a ground, and a first comparator having a negative input terminal electrically connected to one end of the external resistor and a positive input terminal electrically connected to the first reference voltage; and a frequency oscillator which generates the clock signal, which has a variable frequency, in response to the load check signal, the frequency oscillator comprising a current source which supplies a constant current, a plurality of capacitors electrically connected in parallel between the constant current and the ground, a first switch electrically connected between a first part of the capacitors and the ground, the first switch being switched in response to the load check signal, a second switch electrically connected in parallel to a second part of the capacitors, the second switch being switched in response to the clock signal, and a switching unit which outputs the clock signal in accordance with a result of a comparison of voltages respectively charged in the capacitors with second reference voltages.

10. The power supply apparatus of claim 9, wherein the switching unit comprises:

a second comparator having a negative input terminal electrically connected to a voltage charged in at least one of the capacitors and a negative input terminal electrically connected to a lower-level one of the second reference voltages;

a third comparator having a positive input terminal electrically connected to the voltage charged in the at least one of the capacitors and a negative input terminal connected to a higher-level one of the second reference voltages; and an SR flip-flop having an S-input terminal electrically connected to an output from the third comparator, an R-input terminal electrically connected to an output from the second comparator, and an output terminal to output the clock signal.

11. The power supply apparatus of claim 9, wherein the first switch comprises:

an NMOS transistor having a drain and a source which are electrically connected between at least one of the capacitors and the ground; and a gate electrically connected to the load check signal.

12. The power supply apparatus of claim 9, wherein the second switch comprises:

an NMOS transistor having a drain and a source which are electrically connected to the current source and the ground, respectively; and a gate electrically connected to the clock signal.

13. The power supply apparatus of claim 9, wherein the capacitor part electrically connected to the first switch has a capacitance corresponding to one half of a capacitance of the capacitor part electrically connected to the second switch.

14. The power supply apparatus of claim 9, wherein the external resistor has a resistance determined in accordance with a condition of the load current.

15. The power supply apparatus of claim 9, wherein the first reference voltage has a level determined in accordance with a condition of the load current.

16. The power supply apparatus of claim 9, wherein:

the first switch comprises an NMOS transistor having a drain and a source which are electrically connected between at least one of the capacitors and the ground, and a gate electrically connected to the load check signal; and the second switch comprises an NMOS transistor having a drain and a source which are electrically connected to the current source and the ground, respectively, and a gate electrically connected to the clock signal.

* * * * *